(12) United States Patent
Hayashi

(10) Patent No.: US 8,683,120 B2
(45) Date of Patent: Mar. 25, 2014

(54) METHOD AND APPARATUS TO ALLOCATE AREA TO VIRTUAL VOLUME

(75) Inventor: Shinichi Hayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 13/072,862

(22) Filed: Mar. 28, 2011

(65) Prior Publication Data

US 2012/0254532 A1   Oct. 4, 2012

(51) Int. Cl.
*G06F 12/00* (2006.01)

(52) U.S. Cl.
USPC .......................................................... 711/114

(58) Field of Classification Search
None
See application file for complete search history.

(56) References Cited

U.S. PATENT DOCUMENTS

| | | | |
|---|---|---|---|
| 6,216,202 B1 * | 4/2001 | D'Errico | 711/112 |
| 6,823,442 B1 | 11/2004 | Cameron | |
| 6,839,802 B2 * | 1/2005 | Dimitri et al. | 711/112 |
| 2004/0162958 A1 * | 8/2004 | Kano et al. | 711/170 |
| 2006/0010169 A1 * | 1/2006 | Kitamura | 707/200 |
| 2008/0126734 A1 * | 5/2008 | Murase | 711/170 |
| 2010/0077168 A1 * | 3/2010 | Arakawa | 711/165 |

OTHER PUBLICATIONS

Garrett et al., "Compellant Storage Center v4.0, Sophisticated Storage Simplicity", Lab Validation Report, Feb. 2008, pp. 1-17, The Enterprise Strategy Group, Inc., Milford, MA.

* cited by examiner

*Primary Examiner* — Duc Doan
(74) *Attorney, Agent, or Firm* — Mattingly & Malur, PC

(57) ABSTRACT

A storage system comprises a plurality of hard disk drives and a storage controller providing a plurality of virtual volumes to a server and including a processor and a memory. The storage controller allocates pages of the plurality of virtual volumes to the plurality of hard disk drives in response to write requests. The storage controller controls to allocate outer sections of the plurality of hard disks to first addresses of the virtual volume and allocates inner sections of the plurality of hard disk drives to second addresses of the virtual volume, wherein the first addresses are lower than the second addresses.

12 Claims, 18 Drawing Sheets

RAID GROUP INFORMATION ~222

| RAID GROUP NAME ~301 | MEDIA NAME ~302 | RAID LEVEL ~303 | MEDIA TYPE ~304 | CAPACITY ~305 |
|---|---|---|---|---|
| RG A | HDD A, HDD B, HDD C | RAID 5 | HDD 15,000 rpm | 100 ~306 |
| RG B | HDD D, HDD E, HDD F | RAID 5 | HDD 15,000 rpm | 100 ~307 |

Fig. 5

RAID INFORMATION

| RAID GROUP NAME (401) | PAGE NUMBER (402) | LOCATION (403) | RAID GROUP ADDRESS (404) | DATA MEDIA NAME (405) | DATA MEDIA ADDRESS (406) | PARITY MEDIA NAME (407) | PARITY MEDIA ADDRESS (408) |
|---|---|---|---|---|---|---|---|
| RG A | PAGE 200 | 0% | 0 - 9 | HDD A | 0 - 9 | HDD C | 0 - 9 | (409) |
| RG A | PAGE 200 | 0% | 10 - 19 | HDD B | 0 - 9 | HDD C | 0 - 9 | (410) |
| RG A | PAGE 201 | 20% | 20 - 29 | HDD A | 10 - 19 | HDD B | 10 - 19 | (411) |
| RG A | PAGE 201 | 20% | 30 - 39 | HDD C | 10 - 19 | HDD B | 10 - 19 | (412) |
| RG A | PAGE 202 | 40% | 40 - 49 | HDD B | 20 - 29 | HDD A | 20 - 29 | (413) |
| RG A | PAGE 202 | 40% | 50 - 59 | HDD C | 20 - 29 | HDD A | 20 - 29 | (414) |

Fig. 6

LOGICAL VOLUME INFORMATION

| LOGICAL VOLUME NAME | LOGICAL VOLUME ADDRESS | RAID GROUP NAME | RAID GROUP ADDRESS |
|---|---|---|---|
| L-VOL A | 0 - 99 | RG A | 0 - 99 |
| L-VOL B | 0 - 39 | RG B | 60 - 99 |

POOL INFORMATION (225)

| POOL NAME (601) | LOGICAL VOLUME NAME (602) | VIRTUAL VOLUME NAME (603) | CAPACITY (604) |
|---|---|---|---|
| POOL A | L-VOL A, L-VOL B | V-VOL A | 200 |
| | | V-VOL B | 300 |
| POOL B | L-VOL C | V-VOL C | 400 |

VIRTUAL VOLUME INFORMATION (226)

| VIRTUAL VOLUME NAME (701) | VIRTUAL VOLUME ADDRESS (702) | PAGE NUMBER (703) | LOGICAL VOLUME NAME (704) | LOGICAL VOLUME ADDRESS (705) | PAGE NUMBER (706) |
|---|---|---|---|---|---|
| V-VOL A | 0 - 19 | PAGE 0 | L-VOL A | 0 - 19 | PAGE 100 (707) |
| V-VOL A | 40 - 59 | PAGE 2 | L-VOL A | 20 - 39 | PAGE 101 (708) |

| READ COMMAND | | |
|---|---|---|
| 801 | 802 | 803 |
| COMMAND TYPE | VOLUME NAME | VOLUME ADDRESS |
| READ | V-VOL A | 40 - 43 |

| WRITE COMMAND | | | |
|---|---|---|---|
| 821 | 822 | 823 | 824 |
| COMMAND TYPE | VOLUME NAME | VOLUME ADDRESS | DATA |
| WRITE | V-VOL A | 40 - 43 | ABCD |

Fig. 10

RAID GROUP INFORMATION (222)

| RAID GROUP NAME (301) | MEDIA NAME (302) | RAID LEVEL (303) | MEDIA TYPE (304) | CAPACITY (305) |
|---|---|---|---|---|
| RG A | SSD A, SSD B, SSD C | RAID 5 | SSD SLC | 100 (1306) |
| RG B | HDD A, HDD B, HDD C | RAID 5 | HDD 15,000 rpm | 100 (1307) |
| RG B | HDD D, HDD E, HDD F | RAID 5 | HDD 15,000 rpm | 100 (1308) |
| RG B | HDD G, HDD H, HDD I | RAID 5 | HDD 10,000 rpm | 100 (1309) |

RAID INFORMATION (223)

| RAID GROUP NAME (401) | PAGE NUMBER (402) | LOCATION (403) | RAID GROUP ADDRESS (404) | DATA MEDIA NAME (405) | DATA MEDIA ADDRESS (406) | PARITY MEDIA NAME (407) | PARITY MEDIA ADDRESS (408) |
|---|---|---|---|---|---|---|---|
| RG A | PAGE 300 | 0% | 0 - 9 | SSD A | 0 - 9 | SSD C | 0 - 9 | 1409 |
| RG A | PAGE 300 | 0% | 10 - 19 | SSD B | 0 - 9 | SSD C | 0 - 9 | 1410 |
| RG A | PAGE 301 | 5% | 20 - 29 | SSD A | 10 - 19 | SSD B | 10 - 19 | 1411 |
| RG A | PAGE 301 | 5% | 30 - 39 | SSD C | 10 - 19 | SSD B | 10 - 19 | 1412 |
| RG B | PAGE 400 | 25% | 0 - 9 | HDD A | 0 - 9 | HDD C | 0 - 9 | 1413 |
| RG B | PAGE 400 | 25% | 10 - 19 | HDD B | 0 - 9 | HDD C | 0 - 9 | 1414 |
| RG B | PAGE 401 | 35% | 20 - 29 | HDD A | 10 - 19 | HDD B | 10 - 19 | 1415 |
| RG B | PAGE 401 | 35% | 30 - 39 | HDD C | 10 - 19 | HDD B | 10 - 19 | 1416 |

Performance Information 228

| RANK 1501 | MEDIA NAME 1502 |
|---|---|
| 1 | SSD SLC 1503 |
| 2 | SSD MLC 1504 |
| 3 | HDD 15,000 rpm 1505 |
| 4 | HDD 10,000 rpm 1506 |
| 5 | HDD 7,200 rpm 1507 |

Fig. 17

METHOD AND APPARATUS TO ALLOCATE AREA TO VIRTUAL VOLUME

BACKGROUND OF THE INVENTION

The present invention relates generally to storage systems with thin provisioning and, more particularly, to the allocation of an area of a logical volume to a virtual volume.

A HDD (Hard Disk Drive) has a platter to store magnetic data. There are a lot of sectors on the platter. The HDD also has a disk head to read the data from the sector and write the data from the sector. The length of the sector is fixed. The number of sectors on the outer circumference of the platter is more than that on the inner circumference because the length of the outer circumference on the platter is greater than the length of the inner circumference. Therefore, a read time from the outer circumference and a write time to the outer circumference are shorter than those for the inner circumference.

The HDD is accessed with an address to specify the area to read or write. A lower address is allocated to the outer circumference and a higher address is allocated to the inner circumference. Therefore a read time from a lower address and a write time to a lower address are shorter than those for a higher address. There is an application to store data that is frequently accessed to the lower address and to store data that is rarely accessed to the higher address in order to complete read and write processes more quickly.

In recent years, thin provisioning has become popular. Thin provisioning is a method for allocating an area to a virtual volume when a storage subsystem receives a write command to an unallocated area. Existing methods allow a thin provisioning function to allocate an area randomly selected from several HDDs to a virtual volume (see FIG. 1). When an area on a higher address is allocated to a lower address in the virtual volume, the application stores data that is frequently accessed to the higher address in HDD. As a result, performance in the application will decrease. An example for managing virtual volumes in a utility storage server system is found in U.S. Pat. No. 6,823,442.

BRIEF SUMMARY OF THE INVENTION

Exemplary embodiments of the invention provide a technique for allocation of an area of a logical volume to a virtual volume for improved performance. In specific embodiments, a page selection program gets a target address, calculates a location in the virtual volume, and searches a near page which is nearest to the calculated location and disk control program allocates the page to the virtual volume when a storage system receives a write command to unallocated area on a virtual volume. In one embodiment, the page selection program calculates locations of pages of RAID groups based on an address of the pages previously. In another embodiment, the page selection program calculates locations of pages of RAID groups based on an address of the pages and media performance previously. In this way, an area in lower address is allocated to lower address in the virtual volume and application performance does not decrease.

In accordance with an aspect of the present invention, a storage system comprises a plurality of hard disk drives and a storage controller providing a plurality of virtual volumes to a server and including a processor and a memory. The storage controller allocates pages of the plurality of virtual volumes to the plurality of hard disk drives in response to write requests, and the storage controller controls to allocate outer sections of the plurality of hard disks to first addresses of the virtual volume and allocates inner sections of the plurality of hard disk drives to second addresses of the virtual volume, wherein the first addresses are lower than the second addresses.

In some embodiments, the plurality of hard disk drives are allocated to a plurality of logical volumes. The storage controller maps first addresses of the plurality of hard disk drives to be allocated to first addresses of the plurality of logical volumes and maps second addresses of the plurality of hard disk drives to be allocated to second addresses of the plurality of logical volumes, the first addresses of the plurality of hard disk drives are relatively smaller than the second addresses of the plurality of hard disk drives, the first addresses of the plurality of logical volumes are relatively smaller than the second addresses of the plurality of logical volumes. In response to a write request, targeted page of a virtual volume according to the write request is allocated to a page of the plurality of logical volumes, wherein the page of the plurality of logical volumes to be allocated is selected based on the address of the virtual volume. The page of the plurality of logical volumes to be allocated is selected so that an unallocated page closest to a proportionate location of the plurality of logical volumes against the proportionate location of the virtual volume for the targeted page is selected.

In accordance with another aspect of the invention, a storage system coupled to a server via a network comprises: a processor; a memory; a page selection module being configured to obtain a target address of a virtual volume for data of a write request, wherein the target address is unallocated; calculate a location in the virtual volume based on the target address; and search a near page which is nearest to a corresponding location in the logical volume; and a disk control module being configured to allocate the near page in the logical volume to the unallocated target address of the virtual volume. The logical volume is allocated to the virtual volume so as to allocate lower addresses of the logical volume to lower addresses of the virtual volume and to allocate higher addresses the logical volume to higher addresses of the virtual volume.

In some embodiments, the logical volume is mapped to a plurality of hard disk drives each with outer sections of the plurality of hard disk drives having lower addresses of the logical volume than inner sections of the plurality of hard disk drives. In response to a write request from an application in the server, the disk control module allocates a first address of the virtual volume which corresponds to a first section of a hard disk drive for writing a first data of the write request and allocates a second address of the virtual volume which corresponds to a second section of the hard disk drive for writing a second data of the write request, the first data being accessed more frequently than the second data, the first address being a lower address than the second address. The logical volume is mapped to a RAID group and the RAID group is mapped to a plurality of hard disk drives in a manner to allocate a section at a higher circumference to a lower address of the virtual volume than a section at a lower circumference.

In specific embodiments, the logical volume is mapped to different types of storage media having different performance levels, a higher performance media having lower addresses of the logical volume than a lower performance media. The logical volume is allocated to virtual volume so as to allocate higher performance media to lower addresses of the virtual volume and to allocate lower performance media to higher addresses of the virtual volume. The target address of the virtual volume comprises a virtual volume name identifying the virtual volume and a virtual volume address in the virtual volume. Calculating a location in the virtual volume based on the target address comprises calculating a location percentage which is equal to the virtual address divided by a capacity of the virtual volume identified by the virtual volume name. The location percentage is used to find the near page in the logical volume.

Another aspect of this invention is directed to an allocation method for a storage system having a plurality of hard disk drives. The allocation method comprises: providing a plurality of virtual volumes to a server; and allocating pages of the plurality of virtual volumes to the plurality of hard disk drives in response to write requests from the server, including allocating outer sections of the plurality of hard disks to first addresses of the virtual volume and allocating inner sections of the plurality of hard disk drives to second addresses of the virtual volume, wherein the first addresses are lower than the second addresses.

Another aspect of this invention is directed to an allocation method for a storage system coupled to a server via a network. The allocation method comprises: obtaining a target address of a virtual volume for data of a write request, wherein the target address is unallocated; calculating a location in the virtual volume based on the target address; searching a near page which is nearest to a corresponding location in the logical volume; and allocating the near page in the logical volume to the unallocated target address of the virtual volume. The logical volume is allocated to the virtual volume so as to allocate lower addresses of the logical volume to lower addresses of the virtual volume and to allocate higher addresses the logical volume to higher addresses of the virtual volume.

These and other features and advantages of the present invention will become apparent to those of ordinary skill in the art in view of the following detailed description of the specific embodiments.

BRIEF DESCRIPTION OF THE DRAWINGS

FIG. 5 shows an example of RAID group information according to the first embodiment.

FIG. 6 shows an example of RAID information according to the first embodiment.

FIG. 7 shows an example of logical volume information.

FIG. 8 shows an example of pool information.

FIG. 9 shows an example of virtual volume information.

FIG. 10 shows an example of the read command and the write command.

FIG. 15 shows an example of RAID group information according to the second embodiment.

FIG. 16 shows an example of RAID information according to the second embodiment.

FIG. 17 shows an example of performance information according to the second embodiment.

DETAILED DESCRIPTION OF THE INVENTION

Figure 1:
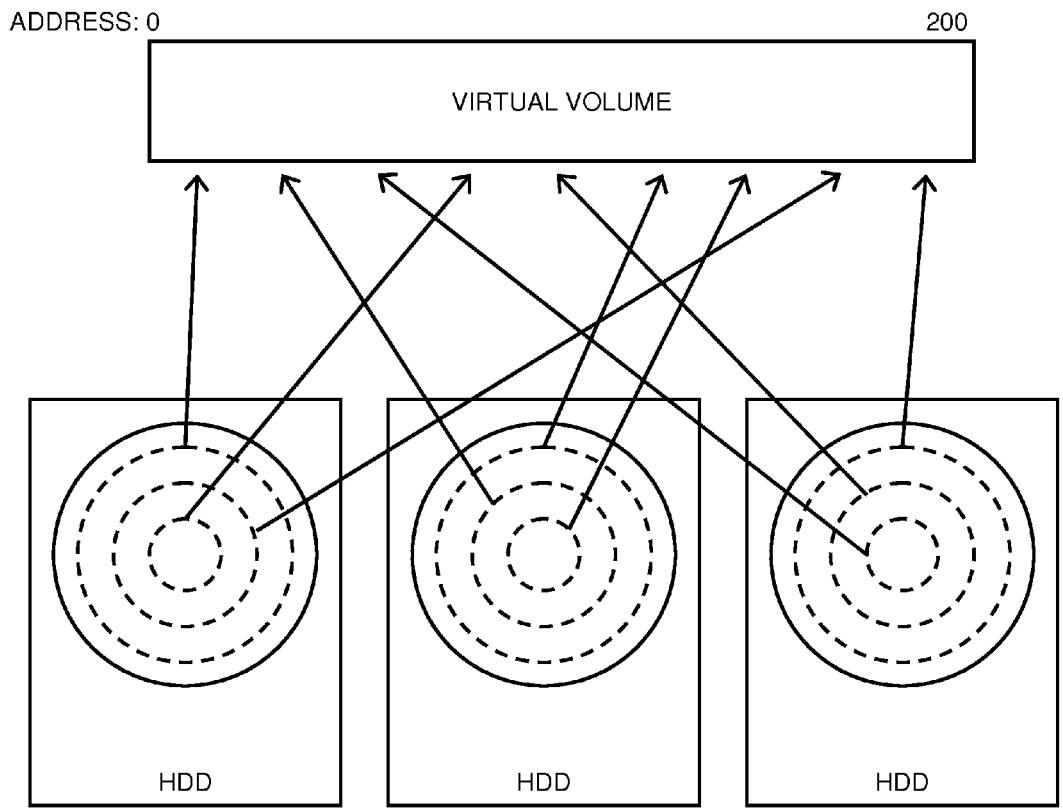
FIG. 1 shows a known thin provisioning function to allocate areas randomly selected from several HDDs to a virtual volume.
Figure 2:
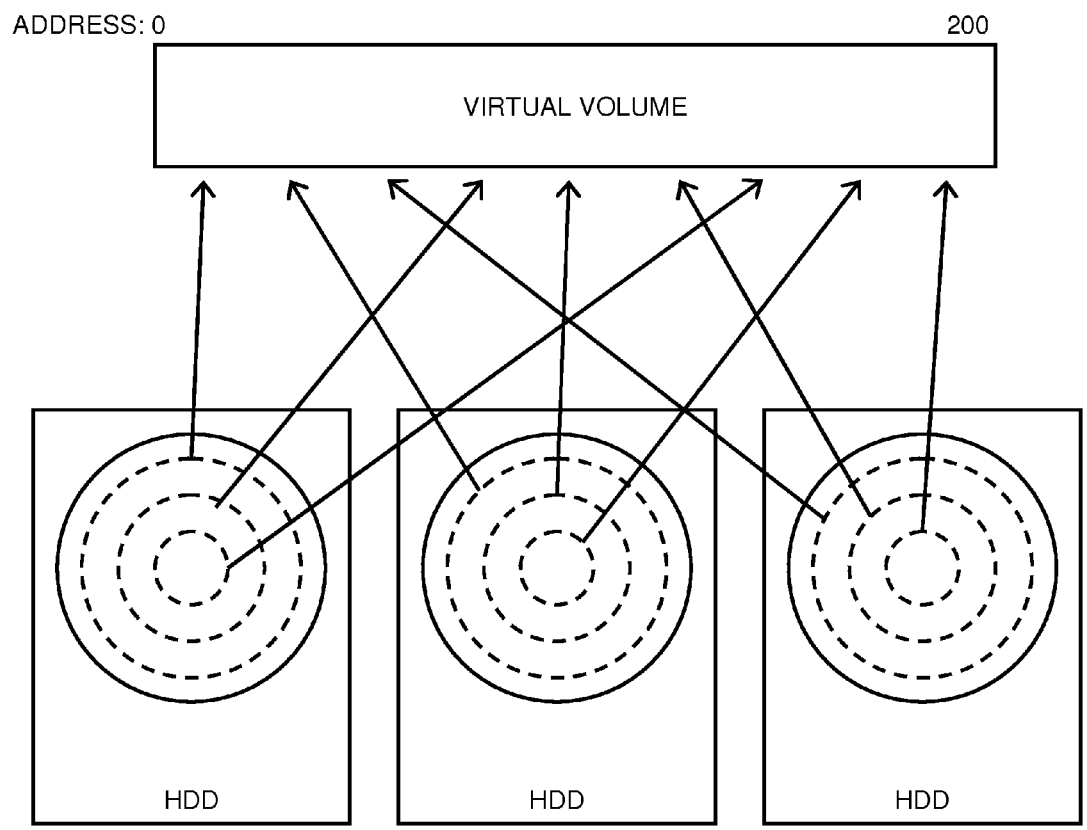
FIG. 2 shows a thin provisioning function to allocate areas selected from several HDDs to a virtual volume according to an embodiment of the present invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for the allocation of an area of a logical volume to a virtual volume.

First Embodiment

Volume Pool Having Only One Media Type

A. System Configuration

Figure 3:
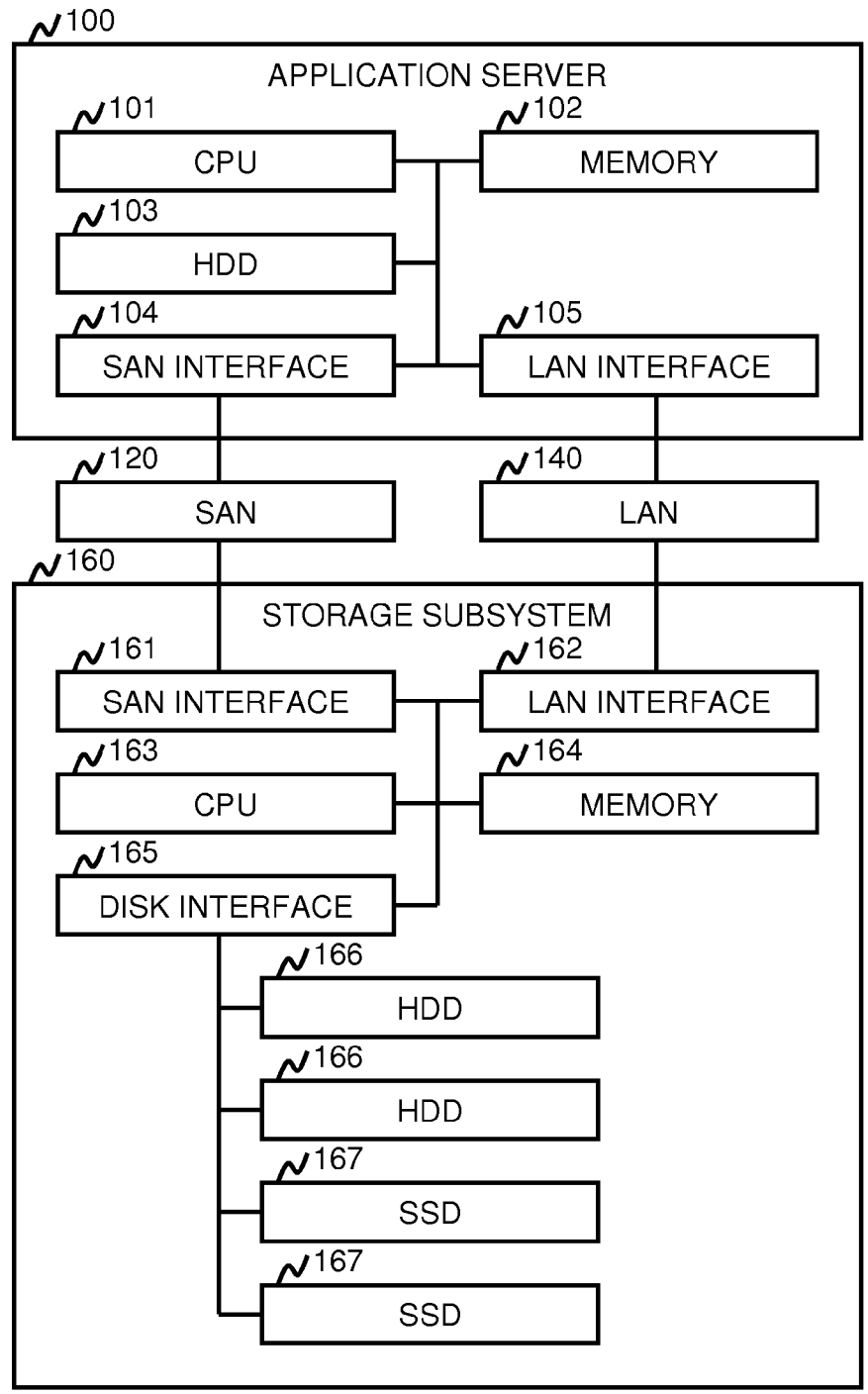
FIG. 3 illustrates an example of a hardware configuration of an information system in which the method and apparatus of the invention may be applied.

FIG. 3 illustrates an example of a hardware configuration of an information system in which the method and apparatus of the invention may be applied. The system comprises an application server 100, a SAN (Storage Area Network) 120, a LAN (Local Area Network) 140, and a storage subsystem 160. The application server 100 comprises a CPU (Central Processing Unit) 101, a memory 102, a HDD (Hard Disk Drive) 103, a SAN interface 104, and a LAN interface 105. The CPU 101 reads programs from the memory 102 and executes the programs. The memory 102 reads programs and data from the HDD 103 when the application server 100 starts and stores the programs and the data. The HDD 103 stores programs and data. The SAN interface 104 connects the application server 100 and the SAN 120. The LAN interface 105 connects the application server 100 and the LAN 140. The SAN 120 connects the application server 100 and the storage subsystem 160. The application server 100 uses the SAN 120 to send application data to the storage subsystem 160 and receive application data from the storage subsystem 160. The application server 100 uses the LAN 140 to send management data to the storage subsystem 160 and receive management data from the storage subsystem 160. The LAN 140 connects the application server 100 and the storage subsystem 160. The storage subsystem 160 comprises a SAN interface 161, a LAN interface 162, a CPU 163, a memory 164, a disk interface 165, a HDD 166, and a SSD (Solid State Drive) 167. The SAN interface 161 connects the storage subsystem 160 and the SAN 120. The LAN interface 162 connects the storage subsystem 160 and the LAN 140. The CPU 163 reads programs from the memory 164 and executes the programs. The memory 164 reads programs and data from the HDD 166 and the SSD 167 when the storage subsystem 160 starts and stores the programs and the data. The disk interface 165 connects the storage subsystem 160, the HDD 166, and the SSD 167. The HDD 166 stores programs and data. The SSD 167 stores programs and data.

Figure 4:
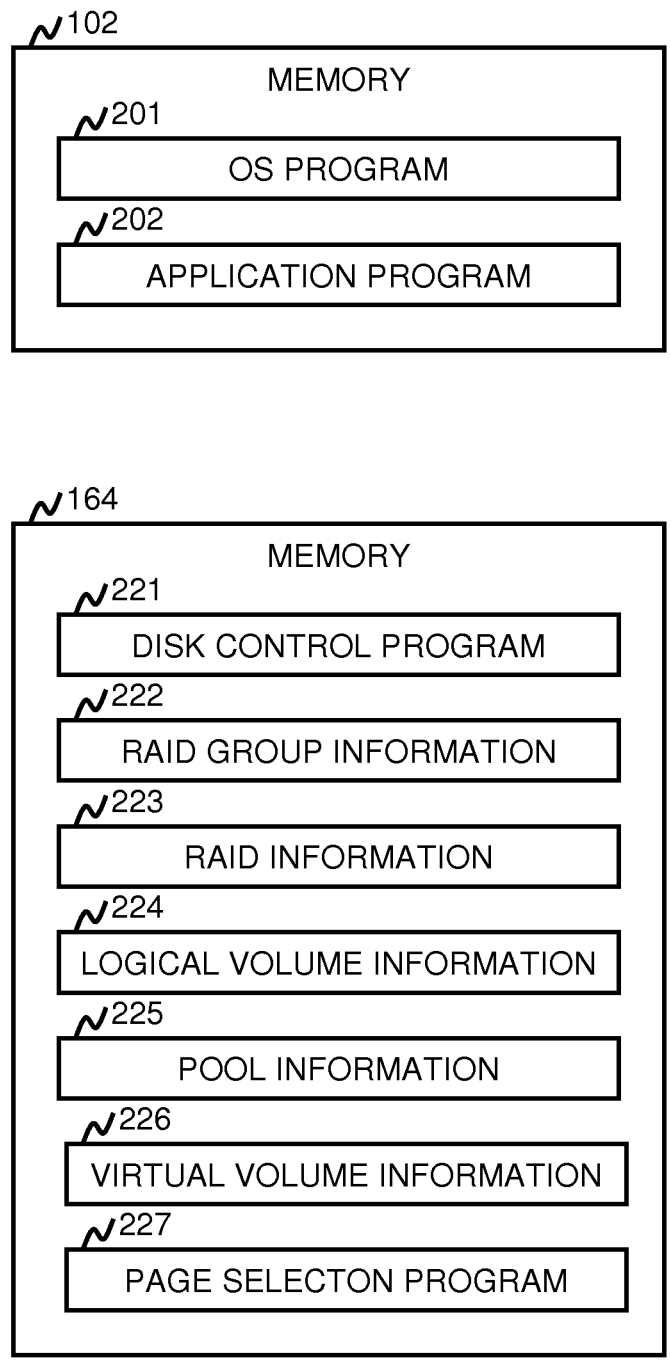
FIG. 4 illustrates an example of the memory in the application server and the memory in the storage subsystem of FIG. 3 according to a first embodiment of the invention.

FIG. 4 illustrates an example of the memory 102 in the application server 100 and the memory 164 in the storage subsystem 160 of FIG. 1 according to the first embodiment. The memory 102 comprises an OS (Operating System) program 201 and an application program 202. The OS program 201 executes the application program 202. The application program 202 (e.g., database program) reads data from the storage subsystem 160, processes data, and writes the results to the storage subsystem 160.

The memory 164 in the storage subsystem 160 comprises a disk control program 221, RAID (Redundant Arrays of Inexpensive (or Independent) Disks) group information 222, RAID information 223, logical volume information 224, pool information 225, virtual volume information 226, and a page selection program 227. The disk control program 221 receives a read command and a write command from the application server 100, reads data from the HDD 166 and the SSD 167, and writes data to the HDD 166 and the SSD 167 using the RAID group information 222, the RAID information 223, the logical volume information 224, the pool information 225, and the virtual volume information 226.

FIG. 5 shows an example of RAID group information 222 according to the first embodiment. The RAID group information 222 includes columns of a RAID group name 301, a media name 302, a RAID level 303, a media type 304, and a capacity 305. For example, the row 306 shows that "RG A" comprises "HDD A," "HDD B," "HDD C," and "HDD D," the RAID level of "RG A" is "RAID 5," "RG A" comprises "HDD 15,000 rpm," and the capacity of "RG A" is "100." There is only one media type in the first embodiment.

FIG. 6 shows an example of RAID information 223 according to the first embodiment. The RAID information 223 includes columns of a RAID group name 401, a page number 402, a location 403, a RAID group address 404, a data media name 405, a data media address 406, a parity media name 407, and a parity media address 408. For example, the row 409 and the row 410 show that the address from "0" to "9" on "PAGE 200" on "RG A" is allocated to the address from "0" to "9" on "HDD A" and located on "0%" from the beginning of "RG A," the address from "10" to "19" on "PAGE 200" on "RG A" is allocated to the address from "0" to "9" on "HDD B" and located on "0%" from the beginning of "RG A," and the parity of "PAGE 200" on "RG A" is located on the address from "0" to "9" on "HDD C."

The page selection program 227 calculates the location 403 when the RAID information 223 is updated. For example, the address of "PAGE 201" on "RG A" is from "20" to "39" and the capacity 305 of "RG A" is "100." Therefore the location 403 of "PAGE 201" is "20%" (20/100).

FIG. 7 shows an example of the logical volume information 224 in the form of a table. The logical volume information 224 includes columns of a logical volume name 501, a logical volume address 502, a RAID group name 503, and a RAID group address 504. For example, the row 505 shows that the address from "0" to "99" of "L-VOL A" is allocated to the address from "0" to "99" in "RG A."

FIG. 8 shows an example of the pool information 225 in the form of a table. The pool information 225 includes columns of a pool name 601, a logical volume name 602, a virtual volume name 603, and a capacity 604. For example, the row 605 shows "POOL A" comprises "L-VOL A" and "L-VOL B," the area of "POOL A" is used by "V-VOL A," and the capacity of "V-VOL A" is "200."

FIG. 9 shows an example of the virtual volume information 226 in the form of a table. The virtual volume information 226 includes columns of a virtual volume name 701, a virtual volume address 702, a page number 703, a logical volume name 704, a logical volume address 705, and a page number 706. For example, the row 707 shows that the address from "0" to "19" on "V-VOL A" is "PAGE 0," the address from "0" to "19" on "L-VOL A" is "PAGE 100," and "PAGE 0" is allocated to "PAGE 100."

FIG. 10 shows an example of the read command 800 and the write command 820. The read command 800 includes a command type 801, a volume name 802, and a volume address 803. The read command 800 is sent from the application program 202 to the storage subsystem 160. The write command 820 includes a command type 821, a volume name 822, a volume address 823, and data 824. The write command 820 is sent from the application program 202 to the storage subsystem 160.

Figure 11:
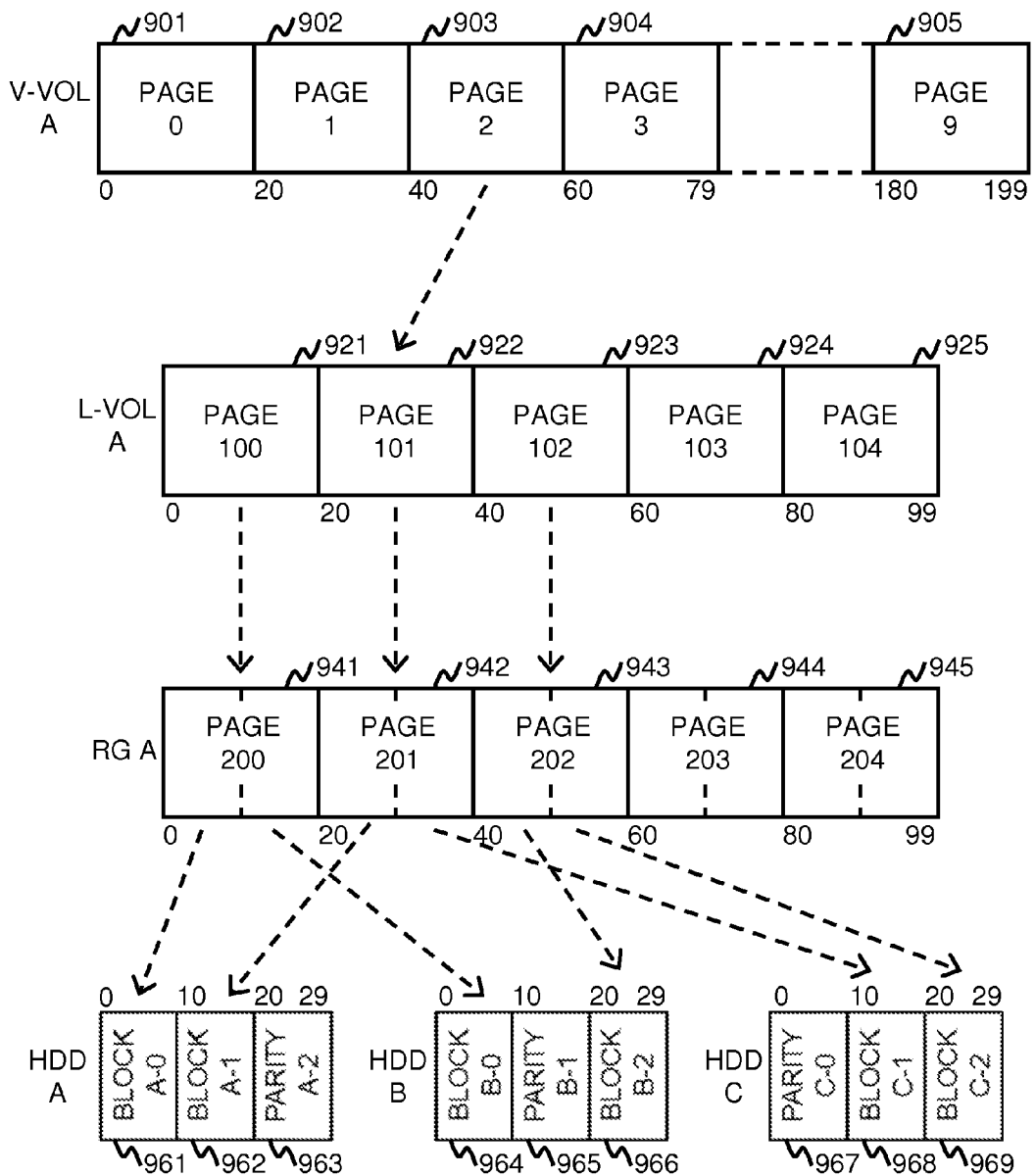
FIG. 11 shows an example of a diagram illustrating relationships between virtual volumes and logical volumes, between logical volumes and RAID groups, and between RAIDs group and HDDs.

FIG. 11 shows an example of a diagram illustrating relationships between virtual volumes and logical volumes, between logical volumes and RAID groups, and between RAIDs group and HDDs. For example, the address from "40" to "59" on "V-VOL A" is mapped to the address from "20" to "39" on "L-VOL A." The address from "20" to "39" on "L-VOL A" is mapped to the address from "20" to "39" on "RG A." The address from "20" to "29" on "RG A" is mapped to the address from "10" to "19" on "HDD A." The address from "30" to "39" on "RG A" is mapped to the address from "10" to "19" on "HDD C."

B. Process Flows

Figure 12:
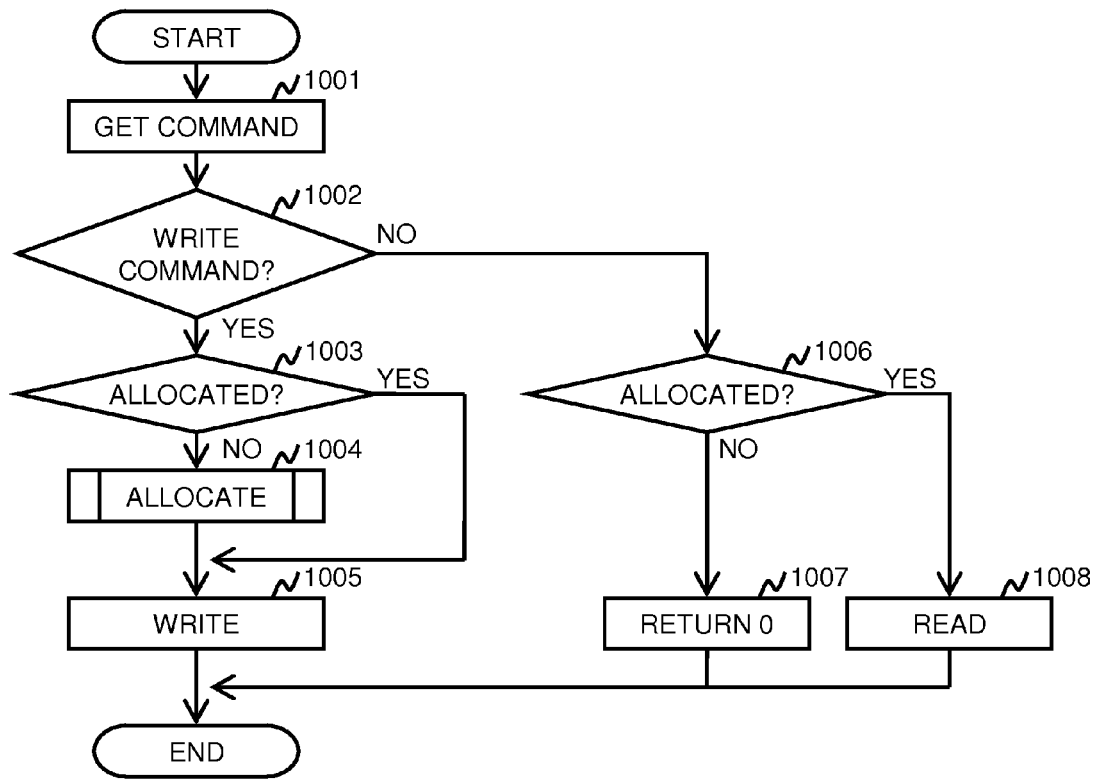
FIG. 12 shows an example of a flow diagram showing that the disk control program receives the read command or the write command from the application program and the disk control program sends the result of read or write.

FIG. 12 is an example of a flow diagram showing that the disk control program 221 receives the read command 800 or the write command 820 from the application program 202, and the disk control program 221 sends the result of read or write. In step 1001, the disk control program 221 receives the read command 800 or the write command 820 from the application program 202. In decision step 1002, if the command that the disk control program 221 received in step 1001 is the write command 820, then the process goes to decision step 1003; if not, then the process goes to decision step 1006.

In decision step 1003, if an area specified by the volume name 822 and the volume address 823 of the write command 820 is allocated in the virtual volume information 226, then the process goes to step 1005; if not, then the process goes to step 1004. In step 1004, the disk control program 221 allocates an unallocated area of a logical volume to the virtual volume specified by the volume name 822 and the volume address 823, and updates the virtual volume information 226.

In step 1005, the disk control program 221 gets the volume name 822 and the volume address 823 from the write command 820, gets the logical volume name 704 and the logical volume address 705 from the virtual volume information 226, gets the RAID group name 503 and the RAID group address 504 from the logical volume information 224, gets the data media name 405 and the data media address 406 from the RAID information 223, gets the parity media name 407 and the parity media address 408 from the RAID information 223, reads an area specified by the data media name 405 and the data media address 406, calculates a parity and writes the data 824 of the write command 820 to an area specified by the data media name 405 and the data media address 406, and writes the parity to an area specified by the parity media name 407 and the parity media address 408. For example, when the volume name 822 is "V-VOL A" and the volume address 823 is an address from "40" to "43", the data 824 is written to an address from "10" to "13" on "HDD A," the disk control program 221 reads an address from "10" to "19" on "HDD A" and an address from "10" to "19" on "HDD C," calculates a parity, and writes the parity to an address from "10" to "19" on "HDD B."

In decision step 1006, if an area specified by the volume name 802 and the volume address 803 of the read command 800 is allocated in the virtual volume information 226, then the process goes to step 1008; if not, then the process goes to step 1007. In step 1007, the disk control program 221 returns "0" to the application server 100 because the area specified by the volume name 802 and the volume address 803 is not written. In step 1008, the disk control program 221 gets the volume name 802 and the volume address 803 from the read command 800, gets the logical volume name 704 and the logical volume address 705 from the virtual volume information 226, gets the RAID group name 503 and the RAID group address 504 from the logical volume information 224, gets the data media name 405 and the data media address 406 from the RAID information 223, reads an area specified by the data media name 405 and the data media address 406, and returns the data.

Figure 13:
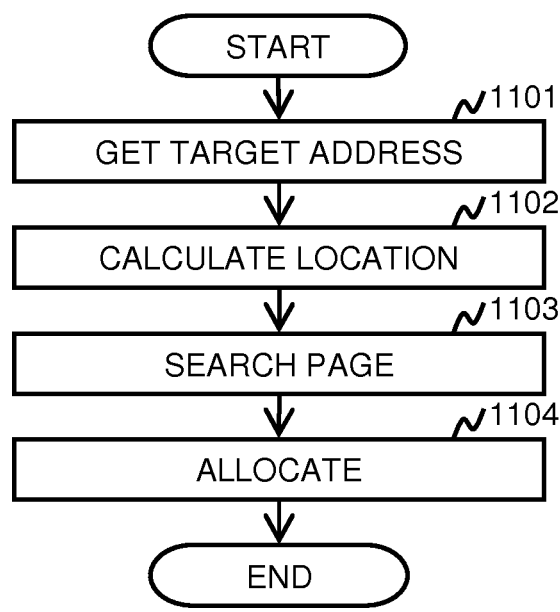
FIG. 13 is an example of a flow diagram showing that the page selection program selects a page and the disk control program allocates the page to a virtual volume in step 1004 of FIG. 12.

FIG. 13 is an example of a flow diagram showing that the page selection program 227 selects a page and the disk control program 221 allocates the page to a virtual volume in step 1004 of FIG. 12. In step 1101, the page selection program 227 gets a target address from the volume name 822 and the volume address 823 of the write command 820. In step 1102, the page selection program 227 calculates a location in the target virtual volume based on the volume name 822 and the volume address 823. For example, when the volume name 822 is "V-VOL A," the volume address 823 is from "40" to "43," and the capacity 604 of "V-VOL A" is "200," the location in the "V-VOL A" is "20%" (=40/200). In step 1103, the page selection program 227 selects a near page which is nearest to the location calculated in step 1102 from the RAID information 223. For example, the page selection program 227 calculated the location and the location was "20%." Therefore the page selection program 227 selects "PAGE 201" where the location 403 of the RAID information 223 is "20%." In step 1104, the disk control program 221 allocates the address from "20" to "39" on the "L-VOL A" to the address specified by the volume name 822 and the volume address 823 because the address of the page selected in step 1103 is from "20" to "39" on the "RG A" from the logical volume information 224.

Second Embodiment

Volume Pool Having Several Media Types

The following describes only differences between the second embodiment and the first embodiment.

A. System Configuration

Figure 14:
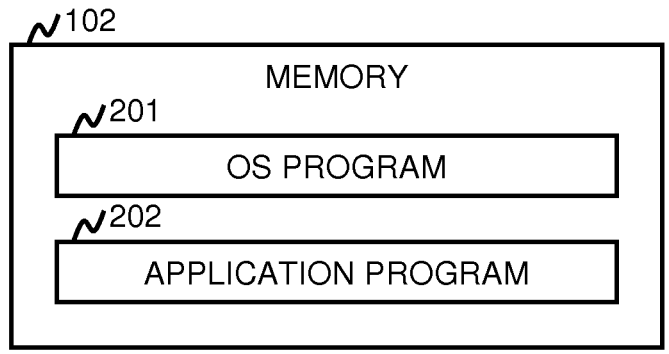
FIG. 14 illustrates an example of the memory in the application server and the memory in the storage subsystem of FIG. 3 according to a second embodiment of the invention.
Figure 14:
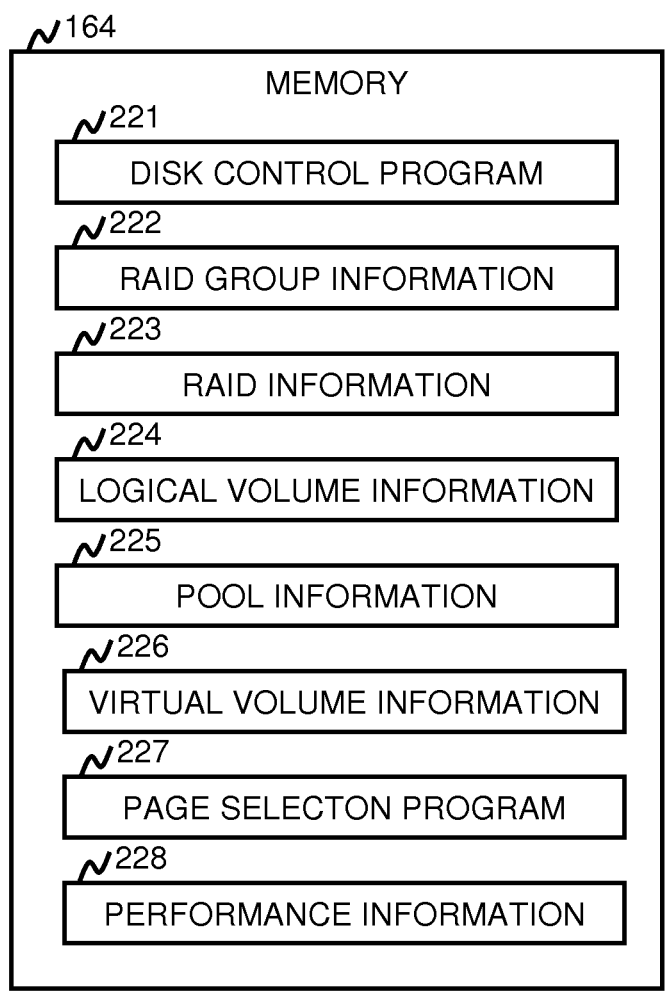

FIG. 14 illustrates an example of the memory 102 in the application server 100 and the memory 164 in the storage subsystem 160 of FIG. 3 according to the second embodiment. The memory 164 comprises a disk control program 221, RAID group information 222, RAID information 223, logical volume information 224, pool information 225, virtual volume information 226, a page selection program 227, and performance information 228. The performance information 228 is not provided in the first embodiment of FIG. 4.

FIG. 15 shows an example of RAID group information 222 according to the second embodiment. Unlike the RAID group information of the first embodiment (FIG. 5), there are several media types in the second embodiment.

FIG. 16 shows an example of RAID information 223 according to the second embodiment. Unlike the RAID information of the first embodiment (FIG. 6), there are several media types in the second embodiment.

FIG. 17 shows an example of performance information 228 according to the second embodiment. The performance information 228 includes columns of a rank 1501 and a media name 1502. For example, the row 1503 shows that "SSD MLC" is the highest performance media.

Figure 18:
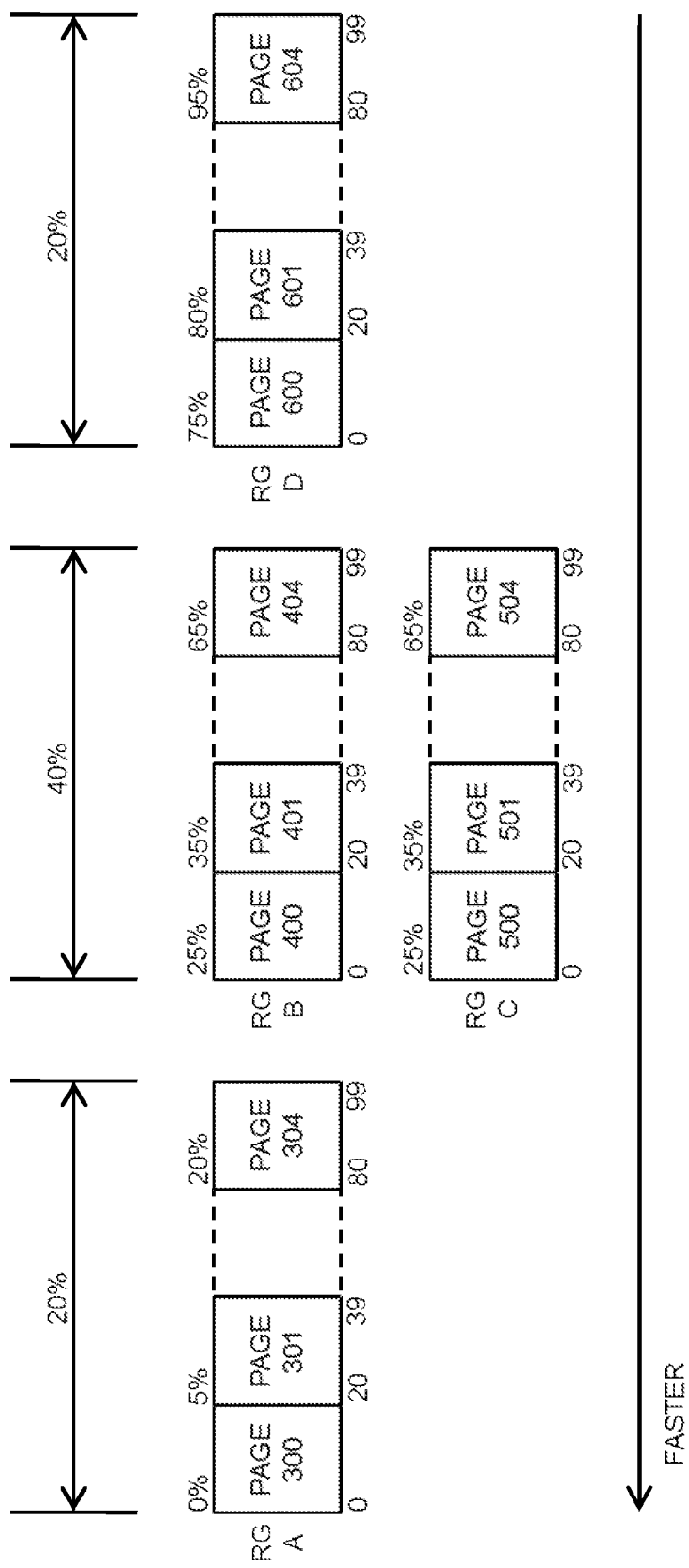
FIG. 18 shows an example of a diagram illustrating calculation of a location according to the second embodiment.

FIG. 18 shows an example of a diagram illustrating calculation of a location according to the second embodiment. There are three media types in the RAID group information 222 in FIG. 15. The highest performance media type is "SSD MLC" according to the performance information 228 and the capacity is "100" according to the RAID group information 222 in FIG. 15. The second highest performance media type is "HDD 15,000 rpm" according to the performance information 228 and the capacity is "200" according to the RAID group information 222 in FIG. 15. The third highest performance media type is "HDD 10,000 rpm" according to the performance information 228 and the capacity is "100" according to the RAID group information 222 in FIG. 15. Therefore, for example, the address of "PAGE 501" on "RG B" is from "20" to "39" and the sum of capacity 305 in FIG. 15 is "400" (=100+100+100+100). The location 403 of "PAGE 501" is "35%" (100+20*2/400). The page selection program 227 calculates the location 403 when the RAID information 223 is updated.

Of course, the system configuration illustrated in FIG. 3 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for the allocation of an area of a logical volume to a virtual volume. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a plurality of hard disk drives; and
a storage controller providing a plurality of virtual volumes to a server and including a processor and a memory;
wherein the plurality of hard disk drives are allocated to a plurality of logical volumes,
wherein the storage controller maps first addresses of the plurality of hard disk drives to be allocated to first addresses of the plurality of logical volumes and maps second addresses of the plurality of hard disk drives to be allocated to second addresses of the plurality of logical volumes, and the first addresses of the plurality of logical volumes are relatively smaller than the second addresses of the plurality of logical volumes,
wherein the storage controller obtains a target address of a virtual volume of the plurality of virtual volumes for data of a write request, the target address being unallocated; calculates a location in the virtual volume based on the target address; and searches a near page which is nearest to a corresponding location in a logical volume;
wherein the storage controller allocates the near page in the logical volume to the unallocated target address of the virtual volume;
wherein the target address of the virtual volume comprises a virtual volume name identifying the virtual volume and a virtual volume address in the virtual volume;
wherein calculating a location in the virtual volume based on the target address comprises calculating a location percentage which is equal to the virtual address divided by a capacity of the virtual volume identified by the virtual volume name;

wherein the location percentage is used to find the near page in the logical volume;

wherein the storage controller controls to allocate pages of the plurality of logical volumes so as to allocate outer sections of the plurality of hard disk drives to lower addresses of the virtual volumes and allocates pages of the plurality of logical volumes so as to allocate inner sections of the plurality of hard disk drives to higher addresses of the virtual volumes.

2. The storage system according to claim 1, wherein the page of the plurality of logical volumes to be allocated is selected so that an unallocated page closest to a proportionate location of the plurality of logical volumes against the proportionate location of the virtual volume for the targeted page is selected.

3. A storage system coupled to a server via a network, the storage system comprising:

a plurality of storage media; and a storage controller providing a plurality of virtual volumes to the server and including a processor and a memory;

wherein the plurality of storage media are allocated to a plurality of logical volumes, and wherein the storage controller maps first addresses of the plurality of storage media to be allocated to first addresses of the plurality of logical volumes and maps second addresses of the plurality of storage media to be allocated to second addresses of the plurality of logical volumes, the first addresses of the plurality of logical volumes being relatively smaller than the second addresses of the plurality of logical volumes;

a page selection module, the page selection module being configured to obtain a target address of a virtual volume of the plurality of virtual volumes for data of a write request, wherein the target address is unallocated; calculate a location in the virtual volume based on the target address; and search a near page which is nearest to a corresponding location in a logical volume; and a disk control module being configured to allocate the near page in the logical volume to the unallocated target address of the virtual volume;

wherein the logical volume is allocated to the virtual volume so as to allocate lower addresses of the logical volume to lower addresses of the virtual volume and to allocate higher addresses the logical volume to higher addresses of the virtual volume;

wherein the target address of the virtual volume comprises a virtual volume name identifying the virtual volume and a virtual volume address in the virtual volume;

wherein calculating a location in the virtual volume based on the target address comprises calculating a location percentage which is equal to the virtual address divided by a capacity of the virtual volume identified by the virtual volume name; and wherein the location percentage is used to find the near page in the logical volume.

4. The storage system according to claim 3, wherein the logical volume is mapped to a plurality of hard disk drives each with outer sections of the plurality of hard disk drives having lower addresses of the logical volume than inner sections of the plurality of hard disk drives, so as to allocate outer sections of the plurality of hard disks disk drives to lower addresses of the virtual volumes and to allocate inner sections of the plurality of hard disk drives to higher addresses of the virtual volume.

5. The storage system according to claim 4, wherein in response to a write request from an application in the server, the disk control module allocates a first address of the virtual volume which corresponds to a first section of a hard disk drive for writing a first data of the write request and allocates a second address of the virtual volume which corresponds to a second section of the hard disk drive for writing a second data of the write request, the first data being accessed more frequently than the second data, the first address being a lower address than the second address.

6. The storage system according to claim 4, wherein the logical volume is mapped to a RAID group and the RAID group is mapped to a plurality of hard disk drives in a manner to allocate a section at a higher circumference to a lower address of the virtual volume than a section at a lower circumference.

7. The storage system according to claim 3, wherein the logical volume is mapped to different types of storage media having different performance levels, a higher performance media having lower addresses of the logical volume than a lower performance media; and wherein the logical volume is allocated to the virtual volume so as to allocate higher performance media to lower addresses of the virtual volume and to allocate lower performance media to higher addresses of the virtual volume.

8. An allocation method for a storage system coupled to a server via a network, the allocation method comprising:

providing a plurality of storage media and a plurality of virtual volumes to the server, wherein the plurality of storage media are allocated to a plurality of logical volumes;

mapping first addresses of the plurality of storage media to be allocated to first addresses of the plurality of logical volumes and mapping second addresses of the plurality of storage media to be allocated to second addresses of the plurality of logical volumes, the first addresses of the plurality of logical volumes being relatively smaller than the second addresses of the plurality of logical volumes;

obtaining a target address of a virtual volume of the plurality of virtual volumes for data of a write request, wherein the target address is unallocated;

calculating a location in the virtual volume based on the target address;

searching a near page which is nearest to a corresponding location in a logical volume; and allocating the near page in the logical volume to the unallocated target address of the virtual volume;

wherein the logical volume is allocated to the virtual volume so as to allocate lower addresses of the logical volume to lower addresses of the virtual volume and to allocate higher addresses the logical volume to higher addresses of the virtual volume;

wherein the target address of the virtual volume comprises a virtual volume name identifying the virtual volume and a virtual volume address in the virtual volume;

wherein calculating a location in the virtual volume based on the target address comprises calculating a location percentage which is equal to the virtual address divided by a capacity of the virtual volume identified by the virtual volume name; and wherein the location percentage is used to find the near page in the logical volume.

9. The allocation method according to claim 8, further comprising:

mapping the logical volume to a plurality of hard disk drives each with outer sections of the plurality of hard disk drives having lower addresses of the logical volume than inner sections of the plurality of hard disk drives, so as to allocate outer sections of the plurality of hard disks disk drives to lower addresses of the virtual volumes and to allocate inner sections of the plurality of hard disk drives to higher addresses of the virtual volume.

10. The allocation method according to claim 9, further comprising:

in response to a write request from an application in the server, allocating a first address of the virtual volume which corresponds to a first section of a hard disk drive for writing a first data of the write request and allocating a second address of the virtual volume which corresponds to a second section of the hard disk drive for writing a second data of the write request, the first data being accessed more frequently than the second data, the first address being a lower address than the second address.

11. The allocation method according to claim 9, wherein the logical volume is mapped to a RAID group and the RAID group is mapped to a plurality of hard disk drives in a manner to allocate a section at a higher circumference to a lower address of the virtual volume than a section at a lower circumference.

12. The allocation method according to claim 8, further comprising:

mapping the logical volume to different types of storage media having different performance levels, a higher performance media having lower addresses of the logical volume than a lower performance media; and wherein the logical volume is allocated to the virtual volume so as to allocate higher performance media to lower addresses of the virtual volume and to allocate lower performance media to higher addresses of the virtual volume.

* * * * *